June 10, 1958 H. A. BING 2,837,853
PHOTOGRAPHIC TRANSPARENCY MOUNT
Filed Sept. 29, 1955
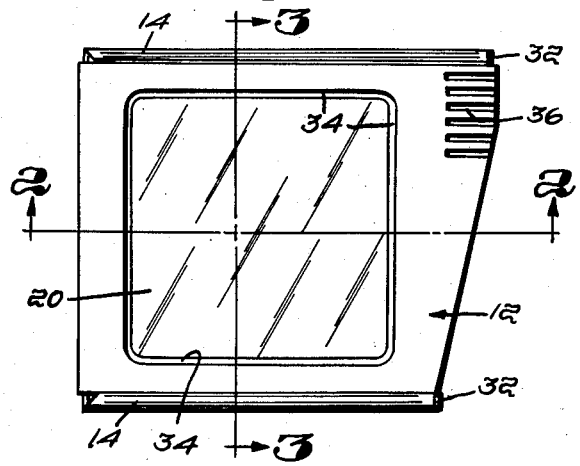
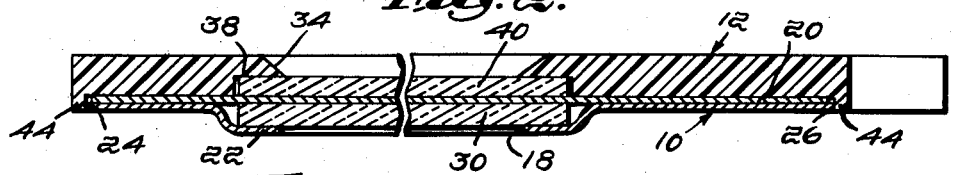
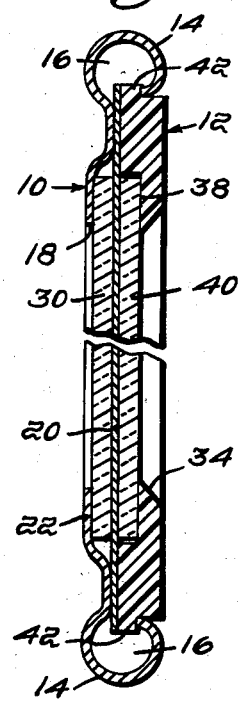
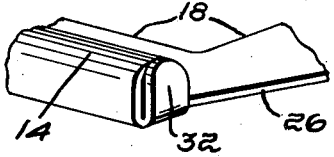
Inventor:
Herbert A. Bing
by Brumbaugh, Free, Graves, Donohue & Raymond
Robert E. Cork
Attorneys

United States Patent Office 2,837,853
Patented June 10, 1958

2,837,853

PHOTOGRAPHIC TRANSPARENCY MOUNT

Herbert A. Bing, Wellesley, Mass., assignor to Polaroid Corporation, Cambridge, Mass., a corporation of Delaware Application September 29, 1955, Serial No. 537,436

9 Claims. (Cl. 40—152)

This invention relates to photographic products and particularly to a novel mount for a photographic transparency.

In copending application Serial No. 537,424, filed September 29, 1955, in the name of Robert C. Casselman, there is disclosed a method of preparing a photographic transparency for exhibition, a mount for the transparency which facilitates protective treatment thereof and the product of said method.

The present invention has, as one of its objects, the provision of a novel improved transparency mount of the type described in the aforementioned application and adapted to the mounting of a transparency either alone or sandwiched between a pair of transparent cover plates.

Another object of the invention is to provide a novel mount of the above type which is simple and inexpensive to fabricate and convenient and easy to use.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is a plan view showing a transparency mounted in the mount of the present invention;

Fig. 2 is a longitudinal cross-sectional view, somewhat enlarged, taken along the line 2—2 of Fig. 1;

Fig. 3 is a transverse cross-sectional view, somewhat enlarged, taken along the line 3—3 of Fig. 1; and Fig. 4 is a fragmentary perspective view, greatly enlarged and showing in detail a segment of the mount of Fig. 1.

The herein-disclosed transparency mount comprises two frame-like elements, a holder 10 and a retaining plate 12. Both elements are similarly asymmetric in shape and substantially coextensive in size. Holder 10 is formed preferably of a resilient sheet material, such as sheet metal, and includes a pair of parallel longitudinal edge sections 14 overturned or rolled forwardly and toward one another to provide parallel lateral channels 16 capable of slidably receiving the longitudinal edge sections of a transparency. The portion of holder 10 between channels 16 is substantially flat and includes a rectangular aperture 18 through which a mounted transparency, indicated at 20, is visible and a rectangular recessed or reentrant section 22 immediately surrounding aperture 18. Holder 10 includes a straight end edge 24 which is substantially perpendicular to longitudinal edge sections 14, the opposite end edge 26 being angular. Edge 26 includes a portion parallel with edge 24 and providing an enlarged corner section 28 at which holder 10 may be gripped and another portion inclined toward edge 24.

Recessed section 22 is adapted to contain a protective cover plate 30 formed of a transparent material, such as plastic or glass, and is equal in depth to the thickness of cover plate 30 so that the forward surfaces of holder 10 and plate 30 are substantially flush. A transparency 20 is positioned in holder 10 by inserting its lateral edges into the open ends of channels 16 and sliding the transparency with its edges so engaged toward one end of holder 10, that is, toward angular transverse edge 26. The transparency is moved in this direction until the end edges of both the transparency and the holder substantially coincide, the transparency being preferably slightly smaller than the holder. By virtue of this arrangement of similar asymmetric shapes, the operator is assured that the transparency is correctly positioned with the image surface thereof facing him, so that it may be protectively treated in the manner described in the aforementioned patent application. As a means for assuring the insertion of the transparency in the correct direction (to the right as shown in the drawing), a pair of tabs 32 are turned up from the end of holder 10 at the corner where edge 26 joins the lateral edges of the holder. Tabs 32 are so formed as to close the ends of channels 16, thereby allowing the introduction of the edges of a transparency into the channels in only one direction, and also function to arrest the movement of the transparency toward edge 26 when it is properly positioned within holder 10.

Retaining plate 12 comprises a substantially flat element considerably thicker than the sheet material comprising holder 10 and is almost identically asymmetric in shape, being slightly longer and narrower than the holder, so that when a slide is assembled from the mount of the invention, plate 12 fits between channels 16 formed by longitudinal edge sections 14 and extends beyond the ends of holder 10. Retaining plate 12 is formed preferably of a plastic material, for example by molding, and includes an aperture 34 generally coextensive with aperture 18 in holder 10 and an enlarged corner section 36 corresponding to the corner section 28 of holder 10. Englarged corner section 36 may be grooved as shown or provided with other suitable surface configurations for aiding in gripping a projection slide formed by assemblage of the mount and for aiding in identifying the forward surface of the slide. This asymmetric shape of the finished slide additionally aids in assuring the correct positioning of the slide in a slide changer or holder of a projector or viewing device, even when the slide is not visible to the operator.

Retaining plate 12 includes a substantially flat rear surface and a recessed section 38 substantially coextensive with recessed section 22 of holder 10. Recessed section 38 is adapted to contain a second transparent protective cover plate 40 and is substantially equal in depth to the thickness of cover plate 40 so that the rear surfaces of plate 40 and retaining plate 12 are substantially flush with one another.

The mount of the invention is assembled to form a slide following the positioning of a transparency 20 in holder 10 by superposing retaining plate 12 with the forward or image surface of the transparency. For this purpose the longitudinal edges of plate 12 are provided with laterally projecting shoulders or flanges 42 adapted to project into channels 16 where they are retained. Plate 12 is positioned and secured in place by merely locating it between edge sections 14 and applying compressive pressure to the holder and plate, causing flanges 42 to coact with the edge sections and deforming them sufficiently to permit flanges 42 to enter channels 16.

The slide may be assembled without transparent cover plates 30 and 40, the marginal sections of the transparency being retained between the adjacent surfaces of holder 10 and retaining plate 12; or, if it is desired, a slide may be assembled with the transparency sandwiched between transparent cover plates 30 and 40 in the manner shown.

Correct longitudinal positioning of retaining plate 12 with respect to holder 10 and prevention of longitudinal movement of a transparency between the frame and holder is assured by providing rearwardly extending shoulders or ribs 44 on the rear surface of plate 12 at the end edges thereof. Shoulders 44 project rearwardly beyond and adjacent the end edges of both transparency 20 and holder 10, thereby preventing longitudinal movement of any of the elements with respect to one another. The thickness of plate 12 is such that when the plate and a holder 10 are assembled together with a transparency in the manner described to form a projection slide, the forward surfaces of rolled edge sections 14 are substantially flush with the forward surface of plate 12. Rolled edges 14 may also extend rearward slightly so that their rear surface is substantially flush with the rear surface of holder 10 at recessed section 22.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A mount for a photographic transparency comprising, in combination, a supporting element and an interlocking retaining plate, said supporting element comprising marginal frame portions providing flat, coplanar surfaces for supporting a face of a transparency on all sides of an image area thereof, a substantially rectangular recessed area formed centrally of said marginal area for holding therein a transparent plate having a thickness substantially equal to the depth of said recess, a central aperture formed in said recessed area, a pair of channels formed at the longitudinal edges of said element by two overturned longitudinal edge portions of said supporting element extending first in a direction similar to that of said recessed area and substantially to the same depth as that of said recessed area and then projecting above said supporting surfaces for slidably receiving said transparency, at least said longitudinal edge portions comprising said channels being resilient, a substantially rigid retaining plate adapted to fit between said channels and including marginal areas corresponding to said marginal areas of said supporting element having coplanar surfaces for supporting the opposite surface of said transparency on all sides of said image area, a substantially rectangular recessed area formed centrally of the inner supporting surface of the last-mentioned marginal areas for holding a second transparent plate having a thickness substantially equal to the depth of the last-mentioned recess, and a central aperture formed in the last-mentioned recessed area, said apertures being adapted to be aligned when said retaining plate is located between said channels, and flanges extending laterally from the longitudinal edges of said retaining plate and adapted to project into said channels, said channels being deformable apart from one another to permit introduction of said flanges into said channels by pressing said retaining plate between said channels toward said supporting element, said channels including longitudinal edge portions projecting toward one another and toward said supporting surfaces of said supporting element for engaging said flanges and resiliently urging said retaining plate toward said supporting element for gripping a transparency between the support surfaces of the marginal areas of said supporting element and retaining plate.

2. The transparency mount of claim 1 wherein a pair of rectangular, transparent, protective plates, substantially equal in thickness to the depths of the recesses of said supporting element and retaining plate, are mounted in said recesses.

3. The transparency mount of claim 1 wherein each of said channels is provided with a closure in the form of an upturned tab at one end for establishing and maintaining predetermined relative longitudinal positions of said supporting element, said retaining plate and a transparency located therebetween.

4. The transparency mount of claim 1 wherein said retaining plate exceeds said supporting element in length and includes at least one end edge portion which projects slightly beyond an end edge of said supporting element when said plate and element are assembled together, and wherein an inwardly projecting ridge is provided on said end edge portion of said retaining plate for engaging said supporting element and maining the relative longitudinal positions of said supporting element, retaining plate and a transparency located therebetween.

5. A mount for a photographic transparency having a substantially uniform marginal frame area surrounding the image area on three sides and an outwardly extending, enlarged marginal area on the fourth side, said transparency mount comprising, in combination, a supporting element and an interlocking retaining plate, said supporting element having a substantially uniform, flat marginal frame area on three sides and an outwardly extending, flat, coplanar, enlarged marginal area on the fourth side for supporting one face of said transparency, a substantially rectangular recessed area formed centrally of the inner supporting surfaces of said marginal areas for holding a transparent plate having a thickness substantially equal to the depth of said recess, a central aperture formed in said recessed area, a pair of channels formed at the lateral edges of said element by two generally curved, overturned longitudinal edge portions of said supporting element extending first in a direction similar to that of said recessed area and substantially to the same depth as that of said recessed area and then projecting above said supporting surfaces for slidably receiving said transparency, at least said longitudinal edge portions comprising said channels being resilient, a substantially rigid retaining plate adapted to fit between said channels and having a substantially uniform, flat, supporting, marginal frame area on three sides and an outwardly extending, flat, coplanar, enlarged marginal area on a fourth side for bearing against and supporting the other face of said transparency, a substantially rectangular recessed area formed centrally of the inner supporting surfaces of said marginal areas for holding a second transparent plate having a thickness substantially equal to the depth of said recess, a central aperture formed in said recessed area, said apertures being adapted to be substantially aligned when said retaining plate is located between said channels, and flanges extending laterally from the longitudinal edges of said retaining plate and adapted to project into said channels, said channels being deformable apart from one another to permit introduction of said flanges into said channels by pressing said retaining plate between said channels toward said supporting element, said channels including longitudinal edge portions projecting toward one another and said support surface of said element for engaging said flanges and resiliently urging said retaining plate toward said supporting element for gripping a transparency between the support surfaces of the marginal areas of said supporting element and retaining plate.

6. A photographic product comprising a positive photographic transparency having a marginal frame area surrounding the image area on all sides, a supporting element and an interlocking retaining plate, said supporting element comprising marginal frame portions providing flat, coplanar surfaces for supporting a face of said transparency on all sides of said image area, a substantially rectangular recessed area formed centrally of said marginal area for holding therein a transparent plate having a thickness substantially equal to the depth of said recess, a central aperture formed in said recessed area and a pair of channels at the longitudinal edges of said element comprising two overturned longitudinal edge portions thereof extending first in a direction similar to that of said recessed area and substantially to the same depth as that of said recessed area and then projecting above said support surfaces for slidably retaining said transparency, at least said longitudinal edge portions comprising said channels being resilient, a substantially rigid retaining plate engaged between said channels and including marginal areas corresponding to said marginal areas of said supporting element and having coplanar support surfaces for supporting the opposite surface of said transparency on all sides of said image area, a substantially rectangular recessed area formed centrally of the inner supporting surface of the last-mentioned marginal areas for holding a second transparent plate having a thickness substantially equal to the depth of the last-mentioned recess, a central aperture formed in said last-mentioned recessed area, said apertures being in substantial alignment, and flanges extending laterally from the longitudinal edges of said retaining plate and engaged in said channels, said channels being deformable apart from one another to permit introduction of said flanges into said channels by pressing said retaining plate between said channels toward said supporting element, said channels including longitudinal edge portions projecting toward one another and toward said support surface of said supporting element for engaging said flanges and resiliently urging said retaining plate toward said supporting element for gripping a transparency between the support surfaces of the marginal areas of said supporting element and retaining plate.

7. The photographic product of claim 6 wherein a pair of rectangular, transparent, protective plates, substantially equal in thickness to the depths of said recesses in said supporting element and retaining plate, are mounted in said recesses in engagement with the surfaces of said transparency.

8. The photographic product of claim 6 wherein each of said channels is provided with a closure at one end in the form of an upturned tab for establishing and maintaining predetermined relative longitudinal positions of said supporting element, said retaining plate and said transparency located therebetween.

9. The photographic product of claim 6 wherein the length of said retaining plate exceeds that of said supporting element and said retaining plate includes at least one end edge portion which projects slightly beyond an end edge of said supporting element, and wherein an inwardly projecting ridge is provided on said end edge portion of said retaining plate for engaging said supporting element and maintaining the relative longitudinal positions of said supporting element, retaining plate and said transparency located therebetween.

References Cited in the file of this patent

UNITED STATES PATENTS

| | | |
|---|---|---|
| 1,524,797 | Mayer | Feb. 3, 1925 |
| 1,633,376 | Freeman | June 21, 1927 |
| 2,088,944 | Young et al. | Aug. 3, 1937 |
| 2,153,149 | MacHarg | Apr. 4, 1939 |
| 2,220,310 | Wood | Nov. 5, 1940 |
| 2,505,250 | Kime et al. | Apr. 25, 1950 |
| 2,541,575 | Davidson | Feb. 13, 1951 |
| 2,697,889 | Heim | Dec. 28, 1954 |

UNITED STATES PATENT OFFICE
CERTIFICATE OF CORRECTION

Patent No. 2,837,853                                                                            June 10, 1958

Herbert A. Bing

It is hereby certified that error appears in the above numbered patent requiring correction and that the said Letters Patent should read as corrected below.

Column 4, line 17, for "maining" read -- maintaining --.

Signed and sealed this 23rd day of January 1962.

(SEAL)
Attest:

ERNEST W. SWIDER                                          DAVID L. LADD
Attesting Officer                                            Commissioner of Patents